United States Patent Office 2,794,944
Patented June 4, 1957

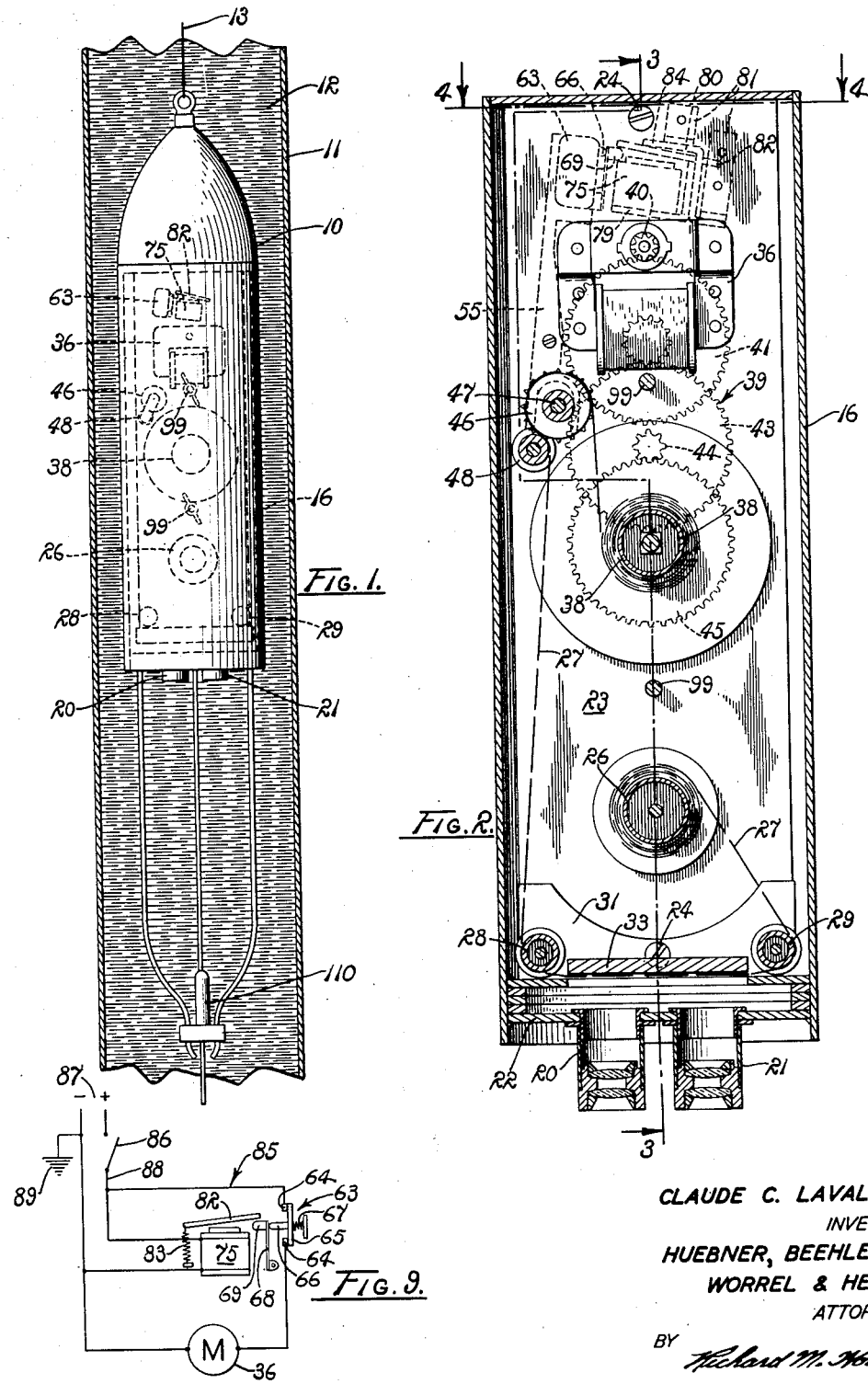

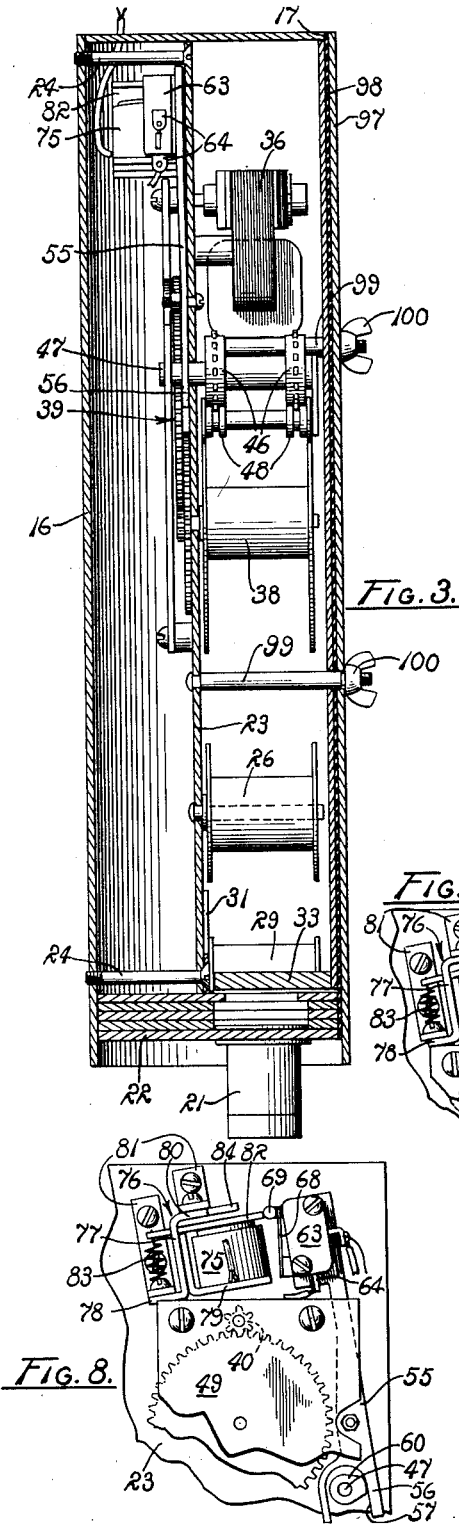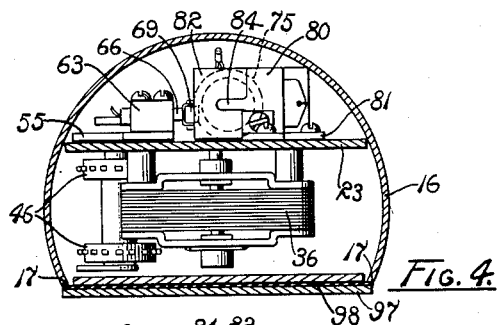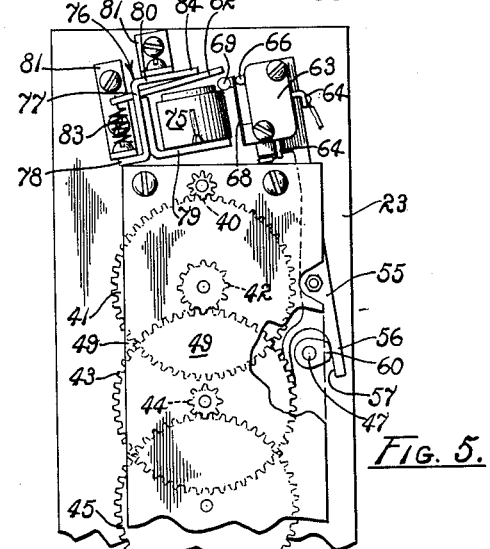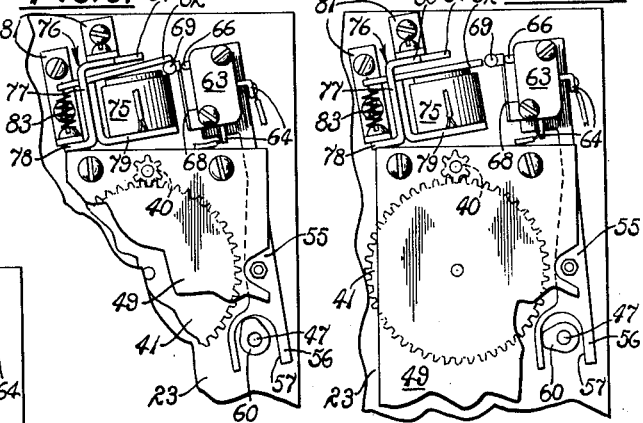

2,794,944

MOTOR CONTROLLED INCREMENT DRIVE SYSTEM

Claude C. Laval, Jr., Fresno, Calif.

Application December 28, 1953, Serial No. 400,464

8 Claims. (Cl. 318—470)

The present invention relates to automatic remote control systems and more particularly pertains to an electrical apparatus for producing positive and discrete predetermined successive increments of movement in a controlled apparatus from a remote position.

This invention deals particularly with the problem of rendering operative and inoperative periodically and selectively certain apparatus from a remote position. In photographing fields of investigation of difficult access, such as at great depths in bore holes or well casings, the controls for actuating the camera, if selective and successive pictures are to be taken, must be operated from the surface of the well. Clearly it is desirable to minimize the number of controls as much as possible. This not only simplifies operation but is conducive to greater assurance of positive operation or quiesency when either is intended. Although the principles of the invention so described could equally as well apply to many and diverse types of apparatus, it is presently being used with success with deep well submersible photographic equipment and for descriptive convenience is described in connection with such use.

In this particular application, it is desirable to take a series of separate photographs at various selected depths and intervals of time while the camera is positioned within the well. It is thus necessary to move the film in predetermined increments of travel relative to the focal point of the lens of the camera after each exposure.

It is an object of this invention to provide a system for controlling cyclically the incremental movement of an actuating means from a remote position.

It is another object remotely to control the movement of film in photographic apparatus.

Another object is to provide means for moving the film in a bore hole camera in predetermined incremental steps by the simple closing and opening of a single switch or otherwise making and breaking a single electrical circuit.

Another object is to provide a system of the nature described controllable by a single switch wherein a cycle of operation of the system is initiated and completed by closing the switch and the system is preconditioned for a subsequent cycle of operation by opening the switch.

These and other objects will be more fully apparent upon reference to the following description.

In the drawings:

Fig. 1 is a vertical fragmentary section taken through a well casing and showing a photographic apparatus incorporating the control system of this invention suspended therein.

Fig. 2 is a somewhat enlarged longitudinal section taken through the housing containing the camera and control apparatus therefor.

Fig. 3 is a longitudinal section of the device taken at the position indicated by line 3—3 in Fig. 2.

Fig. 4 is a transverse section of the device taken at the position indicated by line 4—4 in Fig. 2.

Fig. 5 is a somewhat enlarged fragmentary view showing certain internal structural details of the control apparatus of this invention.

Figs. 6, 7 and 8 are fragmentary views similar to Fig. 5 which show the elements thereof in successive stages of operation.

Fig. 9 is a diagram of the electrical circuit used in the control system of the present invention.

Referring more particularly to the drawings:

The apparatus in general includes a shell 10 which is shown disposed in an upright position within a well-casing 11 containing oil, water or other fluid 12. The shell 10 is lowered and raised within the casing 11 by means of a cable 13 attached to the shell.

A camera housing 16 is mounted in any convenient manner within the shell 10 and is conveniently of a fractocylindrical shape, as best seen in Fig. 4. The housing 16 is provided with an elongated opening 17 extending longitudinally along one side thereof. The opening 17 provides a convenient means of access to the housing.

The photographic apparatus includes a pair of lenses indicated at 20 and 21 supported in spaced positions and endwardly extended from the housing 16. A lens holding plate 22 is mounted in the housing 16 and has the lens members 20 and 21 mounted therein.

A support member or plate 23 of generally rectangular shape is mounted within the housing 16 and has longitudinal edges in abutting relation to the inner periphery of the housing 16. The plate 23 is rigidly retained in position within the housing by a convenient number of screws or bolts, as 24, received in the plate 23 and threadably engageable with the housing 16.

A film holding reel or spool 26 is rotatably mounted adjacent to one end of the support member 23 and has its axis of rotation extending substantially normal to the plane of the support plate 23. A quantity of film, indicated as 27, is wound around the spool 26 for disposition in a manner subsequently to be described. Any convenient means, such as axle friction, is utilized for frictionally resisting the movement of the spool 26 whereby undesirable slack in the film 27 may be prevented. A pair of film guiding spools 28 and 29 are rotatably mounted in spaced relation endwardly of the film holding spool 26 on the support member 23. Spools 28 and 29 are adapted rotatably to receive the film 27 in order to advance the film through the focal plane of the lenses 20 and 21 for exposure purposes. The spools 28 and 29 are mounted on a plate 31 pivotally connected to the support member 23 centrally thereof, as shown at 32. The plate 31 is mounted in substantially flush relation on the support member 23 and is adapted to pivot in a substantially parallel plane relative thereto depending upon the tension applied to the film 27. A holding plate 33 extends outwardly from plate 31 in substantially perpendicular relation thereto and is adapted to hold the film in proper relation to the lenses 20 and 21 as it is advanced between said plate and the lenses.

An electric motor 36 is rigidly mounted on the support member 23 adjacent to the end of said support member opposite from the film holding spool 26. A film receiving spool 38 is mounted on the support member 23 intermediate the film holding spool 26 and the motor 36 and is adapted rotatably to receive the film 27 as it is unwound from the film holding spool 26. The means for advancing the film 27 from the film holding spool 26 to the film receiving spool 38 includes a gear train generally indicated at 39.

Any suitable gear reducing mechanism is suitable for the gear train 39 but, as shown in the illustrative embodiment, it includes a pinion 40 attached to the shaft of the motor 36 in driving engagement with a spur gear 41. Spur gear 41 is rigidly connected to a pinion 42 which in turn drives a spur gear 43. A pinion 44 integrally connected to the spur gear 43 drives a spur gear 45 rigidly connected to the film receiving spool 38. A sprocket member 46 having a pair of sprocket wheels thereon is mounted on a shaft 47, the latter being rotatably mounted on the support member 23 intermediate the motor 36 and the film receiving spool 38 and being edgewardly disposed on said support member. It should be noted that shaft 47 extends through the support plate 23 for a reason soon to be apparent. A pair of pressing rollers 48 on a common shaft are likewise rotatably mounted on the support member 23 adjacent to the sprocket wheel 46. An auxiliary cover plate 49 extends over the gear train 39 and is connected to the support plate 23 thereby providing protection for the gear train.

The film 27 is initially unwound from the film receiving spool 26, is threaded about the spool 29, between the plate 33 and the lenses 20 and 21, and is upwardly extended and threaded around the sprocket member 46 for connection to the film receiving, or take-up spool 38. The pressing roller 48 bears against the film 27 holding it in position on the sprocket member 46.

Upon energization of the motor 36 the film receiving spool 38 is rotated in a counterclockwise direction, as shown in Fig. 2, whereupon the film 27 is advanced into exposing position rearwardly of the lenses 20 and 21. Although unimportant to this invention, it should be noted that the embodiment shown utilizes a stereoscopic camera, this being the reason for providing a pair of axially spaced lenses 20 and 21. It will be apparent as the description proceeds that the control system of the present invention is effective in controlling the movement of film in a camera in the manner desired regardless of the particular structure or type of camera employed and, of course, is adapted for use in innumerable other operational environments.

The foregoing is a largely known structure and has been described with a view to providing an illustrative operational environment for the control system of this invention. It is believed understood that the purpose of the control system now to be described is demonstrated by advancement of the film 27 in predetermined incremental steps whereby successive portions of the film 27 may be sequentially presented for exposure rearwardly of the lens members 20 and 21.

Referring more particularly to Figs. 5 to 8, inclusive, it will be noted that a lever 55 is pivotally mounted intermediate its ends on the support member 23 on the opposite surface thereof from the motor 36, the film spools 26 and 38 and the gear train 39. The lever 55 is provided at one end thereof with a bifurcated portion 56 providing an inner substantially semi-circular cam-following surface 57. It will be apparent from reference to the drawings that as the cam member 60 is rotated, the lever 55 is reciprocated between predetermined inner and outer limiting positions. For example, when the cam 60 is in the position shown in Fig. 5, the lever 55 is pivoted to its inner limiting position and when the cam 60 is in the position shown in Fig. 7, the lever 55 is pivoted to its outer limiting position.

A microswitch, or other suitable switch, 63 is rigidly mounted on the lever 55 at the opposite end thereof from the bifurcated portion 56. For purposes of convenience, the switch 63 is designated an automatic or controlled switch and includes a pair of contact terminals 64—64 and a connecting blade 65, which are schematically represented in Fig. 9. A button 66 controls movement of the blade 65 for engagement thereof with the contact terminals 64—64.

The switch 63 is provided with a spring 67 operable on the blade 65 to urge it into the closed position across the contacts 64—64 of the switch. Switch 63 is also provided with an arm 68 pivotally mounted thereon and extended so that the outer end of the arm rests in engagement with the button 66. A protruding portion 69 is provided on arm 68 for a purpose subsequently to be described. It should be noted, however, that inward pivoting movement of arm 68 on the switch 63 operates to push the button 66 inwardly of the switch against the urging of spring 67 thereby to remove the blade 65 from across switch contacts 64—64.

An electromagnetic device, such as solenoid 75, is rigidly mounted on the support member 23 by means of a bracket 76. The bracket 76 includes a central web 77, lower oppositely extending base portions 78 and 79 and an overhanging portion 80. The base portion 78 and overhanging portion 80 have connected thereto flanged tabs, as 81, for attaching the bracket 76 to the support plate 23. A slot, not shown, is provided in the central web 77 adjacent to the overhanging portion 80. Solenoid 75 is provided with an armature 82 which extends through the slot in web 77 and is fulcrumed on the lower edge of the slot forming part of the web 77. Depending on whether solenoid 75 is energized or de-energized, armature 82 is in either an inner attracted position or an outer retracted position. A spring 83 is connected between one end of armature 82 and the base portion 78 for urging the armature into its outer retracted position when solenoid 75 is de-energized. The opposite end of the armature 82 from the end carrying spring 83 bears in the retracted position against a protruding stop 84 forming an integral part of overhanging portion 80. Stop 84 acts as a limit in the retracted position of armature 82. As best shown in Figs. 7 and 8, the armature 82 is adapted to be disposed in alignment with the protruding portion 69 of arm 68 when the lever 55 is in its inner limiting position. Further, the armature 82 is adapted to move a sufficient distance in the retracted position thereof to permit movement of the protruding portion 69 inwardly between the armature 82 and the solenoid 75, as shown in Figs. 5 and 6.

An electrical circuit 85, shown diagrammatically in Fig. 9, is connected to the various elements above described for providing electrical energization of the apparatus. A master control switch 86 and a suitable source of electrical energy 87 are provided at a control station remotely positioned from the shell 10 and apparatus contained therein. The switch 86, for purposes of convenience, is designated a manual control switch and may be a single-pole single-throw switch. The electrical circuit 85 provides a series connection between the source of electrical energy 87, the manual control switch 86, the automatically controlled switch 63 and the motor 36. The electrical circuit 85 further includes the solenoid 75 in parallel connected relation across the motor 36 and the automatically controlled switch 63. If desired, a single wire control, indicated for example as 88 in Fig. 9, may extend outwardly of the shell 10 and along with the cable 13 to the remote control station at the surface of the well or other desired location. In this event, it is believed understood that the other supply connection for the electrical circuit 85 would be through ground, indicated for example at 89.

A laminated cover plate 97 is provided on the housing 16 for closing the opening 17 therein and is equipped with a gasket 98. To position the cover plate 97 securely in place on the housing 16 and to render the housing fluid tight, a suitable number of bolts, as 99, are mounted in the support plate 23 and extend outwardly for reception in apertures provided in the cover plate 97. Wing nuts, as 100, are provided for threaded reception on the bolts 99 for tightening the cover 97 into place. Although forming no part of the present invention, an illuminating means 110 is provided on the shell 10 endwardly spaced from the lens members 20 and 21.

*Operation*

The operation of this invention is briefly summarized at this point. After a roll of film has been properly positioned on the film receiving spool 26 and threaded under the hold down plate 33 and around the sprocket wheels 46 and connected to the film receiving spool 48, the cover 97 is positioned over the opening 17 on the bolts 99 and, by wing nuts 100, tightened into place. The housing 16 is thereupon placed within the shell 10 and secured in position. The shell 10 is then lowered within the well casing 11 by means of the cable 13 to the desired photographing position.

Assuming that it is desired to advance the film 27 a predetermined increment of travel for presenting unexposed film in the focal planes of the lenses 20 and 21, the manual control switch 86 is closed. It is well to observe, however, that immediately prior to closing the switch 86, the system is as shown in Fig. 5. The motor 36 is de-energized, the automatically controlled switch 63 has its blade 65 closed across contacts 64—64, and the armature 82 is in the retracted position. The lever 55 is pivoted to its inner limited position with the cam resting in a substantially three o'clock position, as shown in Fig. 5. Therefore, when the master control switch 86 is closed, the motor 36 is energized from source 87 through the closed contacts 64—64 of the automatically controlled switch 63. The motor 36 being energized rotates its shaft to turn the pinion 40 thereon. Through the gear train 39, the pinion 40 drives the film receiving spool 38 to advance the film 37 windably on spool 38 from the film receiving spool 26. The film travels from spool 26 under the plate 33, over the sprocket wheels 46 and onto the film receiving spool 38. The sprocket wheels rotate the shaft 47 associated therewith and thus cam 60 secured to shaft 47 is rotated. The cam 60 on rotating in a counterclockwise direction, as shown in Figs. 5 to 7, inclusive, rides on the cam-following surface 57. As will be observed from Figs. 5 and 7, when the cam 60 has moved substantially 180° to a substantially nine o'clock position, it will have pivoted the lever 55 to its outer limiting position. It should be noted at this point that solenoid 75 was initially energized when the master control switch 86 was closed but due to the initial inner position of the protruding portion 69 on arm 68 associated with the automatically controlled switch 65, the armature 82 was prevented from moving into its attracted position. However, since solenoid 75 remains energized during the outward pivoting movement of lever 55 whereby the protruding portion 69 is moved out of the path of the armature 82, the latter is permitted to move into its attracted position, as shown in Fig. 7.

Further rotation of motor 36 and resultant rotation of shaft 47 on the sprocket member due to film travel thereover, rotates the cam 60 counterclockwise from its substantially nine o'clock position whereupon it rides on the cam-following surface. During most of the lower half of the cycle of rotation of cam 60, there is little or no movement of arm 55, it remaining in its outer limiting position. However, when cam 60 again contacts surface 57 on its upward sweep, the arm 55 again pivots inwardly and when the cam 60 has completed its cycle and is once again in a substantially three o'clock position as shown in Fig. 8, the lever 55 is in the inner limiting position, as also shown in Fig. 8. Since the armature 82 has moved to its attracted position during outer pivoting movement of arm 55, as explained above, when the protruding portion is again moved inwardly by the lever 55 it engages the armature 82 and pivots rearwardly to depress the button 66 and open the automatic control switch 63.

An inspection of Fig. 9 will indicate that opening of automatic control switch 63 opens the circuit to the motor 36 whereby the same is de-energized. When the motor is de-energized, its shaft obviously stops rotating and therefore, the advancement of film 27 ceases. Since solenoid 75 is directly across the line, it remains energized so that its armature 82 stays in an attracted position. Further, since the arm 55 is held in its inner position by cam 60, the arm 68 is pivoted inwardly by armature 82 bearing against protruding portion 69. Arm 68 thus bears against button 66 on the automatic control switch 66 on moving blade 65 away from contacts 64—64. Subsequent energization of the motor 36 in this condition of the system is not permitted since as long as solenoid 75 remains energized and arm 55 stays in the inner position, switch 63 remains open.

However, in order to recondition the system for a subsequent cycle of operation, it is only necessary to open the master control switch 86 whereupon the solenoid 75 is de-energized thereby releasing the armature 82 into its retracted position and permitting the arm 68 to pivot inwardly to enable blade 65 to close across the contacts 64—64 of the automatically controlled switch 63. Closing of the automatic control switch 63 preconditions the electrical circuit 85 in the normal static condition thereof whereby subsequent closing of the master control switch 86 enables repetition of operation.

The exposure of the film which is then stationary is effected in any convenient manner by shutter actuation or preferably by brief energization of the lamp 110 upon opening of the switch 86 in the manner described in my United States Patent No. 2,633,783, issued April 7, 1953, entitled Apparatus Adapted To Provide Photographic Records of Wells and the like.

The above described system is accurate in providing a predetermined increment of film travel since the cam 60 is permitted to rotate only through a predetermined angular rotation on each cycle of operation. By connecting the cam 60 to the sprocket wheel 46, it is insured that accurate movement of the film is transferred to the cam whereby the same predetermined amount of film travel is obtained on each cycle of operation. More specifically, since the film is constrained to move over the projecting sprocket wheel 46, a given amount of film movement always results in the same amount of cam rotation.

It will be observed that oscillatory pivotal movement of the arm 55 carries the switch 63 and control member 69 back and forth through a predetermined path of travel. It will also be observed that successive energization and de-energization of the solenoid 75 moves the armature 82 back and forth through a predetermined path of travel between a retracted position, into which it is urged by the spring 83, and a control position, to which it is drawn when the solenoid is energized. Further, it will be noted, that one end of the reciprocal path of travel of the control member 69 coincides with the control position of the armature. As a result when the switch 86 is closed to actuate the motor 36, the armature 82 is drawn downwardly against the control member 69, which is then in control position and blocks movement of the armature into said position. This condition is shown in Fig. 6. Travel of the motor causes the switch and control member to move to the right, as viewed, retracting the control member and permitting the armature to be drawn into control position. This condition is shown in Fig. 7. Further travel of the motor returns the switch and control member to the left, as shown in Fig. 8, so that the control member engages the armature located in control position to open the switch 63. Opening of the switch 63 stops the motor 36 but has no effect on the solenoid 75 which continues to hold the armature in control position and the switch 63 in open condition. This condition prevails so long as the circuit is energized and precludes inadvertent motivation of the film. If the manual switch 86 is then opened, the field of the solenoid collapses, the spring 83 moves the armature to retracted position, the control member is permitted to move into control position, and the switch 63 is permitted to close preconditioning the circuit for repeat operation. This condition is shown in Fig. 5.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A control system comprising a support means; a motor; mounted on the support means; a manual control switch having an open and a closed position; an electrical circuit including a source of energy connecting the manual control switch in series with the motor for energizing the motor in the closed position of said switch; a lever pivotably mounted on the support means for oscillating movement to and from a predetermined limiting position, the lever having a bifurcated end defining a cam-following surface; said circuit including an automatic switch in series with the motor and the manual switch mounted on the lever having an open position for de-energizing the motor and a closed position, said automatic switch also having yieldable means for urging the switch into closed position; a control member mounted on the lever operably associated with the automatic switch; a solenoid mounted on the support means adjacent to the lever and having an armature associated therewith movable between an attracted position disposed for engagement with the operating arm in the limiting position of the lever for opening the automatic switch and a retracted position; means yieldably urging the armature into the retracted position thereof, said solenoid being connected to the circuit in parallel with the automatically controlled switch and the motor; and a cam rotatably mounted on the support means having driven connection to the motor and operably associated with the cam-following surface of the lever for moving the lever to and from its limiting position in response to motor actuation whereby the automatic switch is opened by engagement with the armature when the solenoid is energized, said solenoid being operable upon opening of the manual control switch to release its armature into the retracted position whereby the automatic switch is closed by its yieldable means preconditioning the circuit for a successive cycle of operation.

2. In an electric circuit including an electric motor, the combination of an automatic switch connected electrically in series with the motor, a manual control switch in series with the motor and the automatic switch, a switch control member operably associated with the automatic switch movable between predetermined switch-opening and switch-closing positions relative to the automatic switch, means having driven connection to the motor and mounting the switch and control member thereon for reciprocal movement of the switch and control member through a predetermined path of travel, a solenoid electrically connected in parallel with the automatic switch having an armature mounted for reciprocal movement in a predetermined path between a control position to which it is drawn when the solenoid is energized and a retracted position, resilient means connected to the armature of the solenoid yieldably urging the armature into retracted position, the path of the switch control member and the path of the armature coinciding in the control position of the armature and the switch control member and the armature each when in control position blocking the movement of the other into said position whereby energizing of the circuit to actuate the motor sequentially urges the armature toward control position against the control member situated therein, travel of the motor withdraws the control member from the path of the armature whereupon said armature is drawn into control position by the solenoid, continued travel of the motor returns the automatic switch and control member toward said control position whereupon the control member engages the armature and opens the automatic switch to stop the motor and whereby upon subsequent de-energizing of the circuit the armature is released to return to retracted position permitting the control member to return to control position and the automatic switch to close preconditioning the circuit for repeat operation.

3. In an electric circuit including electrically energized drive means; the combination of a switch having open and closed positions and including means yieldably urging the switch into closed position; means connecting the switch electrically in series with the drive means; a switch control member engageable with the switch and movable between predetermined switch-opening and retracted positions relative to the switch; an electromagnetic means electrically connected in parallel with the series circuit of the switch and the drive means and having an armature mounted for reciprocal movement in a predetermined path between a predetermined control position when the electromagnetic means is energized and a retracted position when the electromagnetic means is de-energized; and movable means having driven connection to the drive means and mounting the switch and control member thereon for reciprocal movement of the switch and control member through a predetermined path of travel between a position wherein the switch control member is engageable with the armature of the electromagnetic means when the armature is in control position thereby to move the switch control member to switch-opening position and a position wherein the switch control member is separated from engagement with the armature thereby to permit movement of the switch control member into switch-closing position.

4. A remote control increment drive system comprising an electrically actuated motivating means, a master switch located remotely from the motivating means and connected electrically in series therewith, an automatic switch having resilient means urging the switch into closed position and providing a control member movable between predetermined switch opening and retracted positions, said automatic switch being connected electrically in series with the control switch and the motivating means, mounting means having driven connection to the motivating means and mounting the automatic switch thereon for oscillatory movement between a predetermined switch opening position and a retracted position with the control member moving along a predetermined path of travel, an electro-magnet connected electrically in parallel with the series circuit of the motor and the automatic switch and in series with the master switch having an armature movable toward a predetermined closed position when the electro-magnet is energized and providing resilient means urging the armature into a predetermined open position, and means supporting the electro-magnet in such relation to the automatic switch that the armature when in closed position lies in the path of travel of the control member for engagement therewith and that the armature when in open position is out of the path of travel of the control member whereby closing of the armature prior to movement of the automatic switch to opening position causes the armature to engage the control member for urging the control member into switch opening position to open the switch and whereby the control member blocks return of the armature to closed position when the armature is in open position and the automatic switch is in opening position thereby to render the armature inoperable to open said switch until the switch is oscillated to retracted position and return.

5. In combination, a support member, a motor mounted on the support member, a control switch, an electrical circuit connecting the switch and the motor in series for enabling cyclical operation of the motor upon opening and closing of the control switch, said circuit including an automatic switch having a normally closed position and an open position, a lever pivotally mounted on the support member, means mounting the automatic switch on the lever, means driven by the motor for reciprocally moving the lever between an operable and an inoperable position upon actuation of the motor so as to move the automatic switch along a predetermined path of travel, and an electromagnet mounted on the support member adjacent to the lever including an armature reciprocal between a predetermined switch opening position in the path of travel of the automatic switch for engagement with the automatic switch so as to urge the automatic switch into open position as the lever moves from inoperable to operable position, and a retracted position out of the path of the automatic switch to permit the automatic switch to return to closed position in response to opening of the control switch whereby said electrical circuit is preconditioned for a subsequent cycle of operation.

6. A remote control increment drive system comprising an electrically actuated motivating means; a control switch located remotely from the motivating means; an automatic switch having resilient means urging said automatic switch into closed position and providing a control member reciprocally positionable in a predetermined plane of movement between predetermined automatic switch opening and switch closing positions in said plane, the automatic switch being connected electrically in series between the control switch and the motivating means; means mounting the automatic switch for oscillatory movement in the plane of the control member of the automatic switch in substantial alignment with the oscillatory movement of the control member; a drive linkage interconnecting the automatic switch mounting means and the motivating means oscillating the mounting means and automatic switch when the motivating means is actuated; and an electro-magnet connected electrically in parallel with the motivating means and the automatic switch and in series with the control switch having an armature mounted for reciprocal movement between an automatic switch opening position, to which it is drawn by energization of the electro-magnet, engageable with the switch control member when the automatic switch is moved by the mounting means in the direction of the switch opening position of the control member from its switch closing position and a retracted position laterally displaced from alignment with the oscillatory movement of the control member, to which retracted position the armature is urged when the electro-magnet is de-energized.

7. A cyclically operated incremental drive system comprising a support; a motor having a rotary shaft mounted on the support; a master switch positioned remotely from the support, connected to a source of electric energy, and having open and closed positions; an electrical circuit connecting the source of energy and the master switch in series with the motor for actuation of the motor; a lever mounted on the support for oscillatory movement between predetermined first and second positions; an automatically controlled switch connected in said circuit in series with the motor and the master switch having open and closed positions, controlled switch opening and closing means yieldably urged into closed position, and being mounted on the lever for movement of the switch opening and closing means along a predetermined path of travel as the lever moves between said first and second positions; electro-responsive means connected in parallel across the series combination of the motor and the automatically controlled switch having an armature movable between a holding position when the electro-responsive means is energized in the path of travel of the switch opening and closing means and engageable with the switch opening and closing means to open the controlled switch when the lever moves to said first position, and a released position when the electro-responsive means is de-energized out of the path of travel of the switch opening and closing means to permit the switch opening and closing means to close said controlled switch while the lever remains in the first position whereby said circuit is conditioned for a further cycle of operation, the controlled switch when closed with the lever in said first position blocking the armature from movement to holding position and when the lever is moved to its second position permitting the armature to return to holding position upon energization of the electro-responsive means; and driving means connected to the rotary shaft of the motor having driving connection to the lever for oscillating the lever between said first and second positions upon actuation of the motor.

8. In combination, a support; an electrically operated drive means mounted on the support; a master switch having an open and a closed position remotely positioned from the support; an electrical circuit including an energy source connecting the switch to the drive means for energizing the drive means in closed position of the master switch; a lever mounted on the support for oscillating movement to and from a predetermined control position having driven connection to the drive means; an automatically controlled switch in series with the drive means and the master switch having an open position for stopping the drive means and a closed position, being yieldably urged into closed position and being movable into open position by an operating arm, said controlled switch being mounted on the lever for movement of the arm along a predetermined path as the lever moves to and from its control position; electro-responsive means mounted on the support adjacent to the lever and having an armature movable between an attracted position in the path of travel of the arm so as to engage the arm in the control position of the lever for opening the controlled switch, and a retracted position out of the path of the arm; and yieldable means for urging the armature into retracted position, said electro-responsive means being connected in said circuit in parallel with the series combination of the automatically controlled switch and the drive means for energization in the closed position of the master switch.

References Cited in the file of this patent

UNITED STATES PATENTS

| | | |
|---|---|---|
| 755,822 | Whittlesey | Mar. 29, 1904 |
| 1,119,967 | Landsiedel | Dec. 8, 1914 |
| 1,675,495 | Kade | July 3, 1928 |
| 2,338,029 | Doll | Dec. 28, 1943 |
| 2,633,783 | Laval | Apr. 7, 1953 |